(No Model.)
R. S. WARING.
JOINT FOR LEAD COVERED CABLES.
No. 371,808. Patented Oct. 18, 1887.
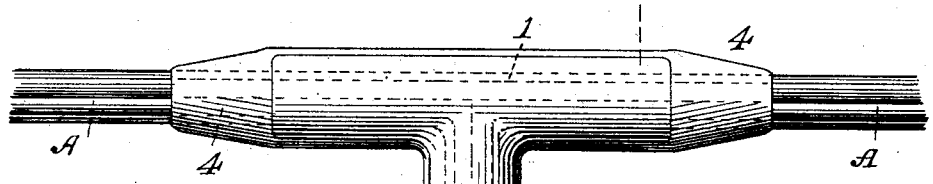
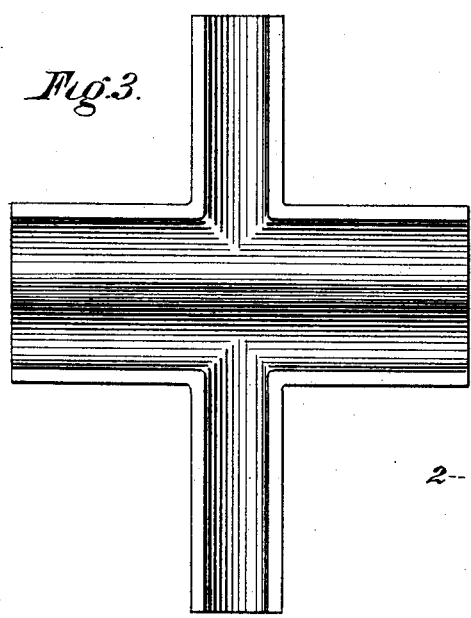
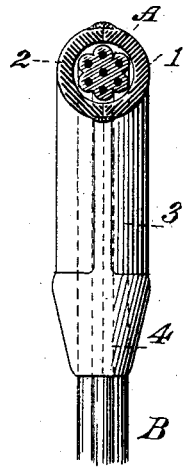
WITNESSES:
C. M. Clarke
M. S. Murphy
INVENTOR,
Richard S. Waring.
By Darwin S. Wolcott
Att'y.

UNITED STATES PATENT OFFICE.

RICHARD S. WARING, OF PITTSBURG, PENNSYLVANIA.

JOINT FOR LEAD-COVERED CABLES.

SPECIFICATION forming part of Letters Patent No. 371,808, dated October 18, 1887.

Application filed October 1, 1886. Serial No. 215,083. (No model.)

*To all whom it may concern:*

Be it known that I, RICHARD S. WARING, residing at Pittsburg, in the county of Allegheny and State of Pennsylvania, a citizen of the United States, have invented or discovered certain new and useful Improvements in Joints for Lead-Covered Cables, of which improvements the following is a specification.

In the accompanying drawings, which make part of this specification, Figure 1 is a plan view of a section of a lead-covered electric cable and a branch connection, showing my improved means for protecting the joints of the conductors. Fig. 2 is a sectional view of the same, the section being taken on the line $x\ x$, Fig. 1. Fig. 3 is a plan view of a modification of the protecting-sleeve.

My invention relates to certain improvements in protecting the joints for branches or loops leading from a lead-covered electric cable.

It has heretofore been the practice to form a plumber's wipe-joint around the united ends of the cable and branch after said united ends and the exposed parts adjacent thereto have been wrapped with some fibrous material and covered with insulating material, said wipe-joint extending from the lead covering of the main cable to that of the branch line, as fully shown and described in Letters Patent No. 294,546, granted to me March 4, 1884. As this manner of protecting the joints is at times difficult of application, I propose to provide a sectional shield or cover which can be easily and quickly applied to the joint; and to this end the invention consists, in general terms, in the construction and combination of parts, substantially as hereinafter described and claimed.

In carrying out my invention the wires of the main and branch cables A and B are connected, and the united ends and exposed portions thereof are protected, as described in the patent above referred to. To opposite sides of the main and branch cable, at their point of junction, are applied shields or plates 1 and 2, in this instance the main portion of said shields being provided or formed with a lateral extension, 3, to fit over the branch cable. These shields or covers are made concavo-convex, each fitting nearly or quite half-way around the main and branch cables, and are soldered together along their adjacent edges, thus completely inclosing the joints of the conductors and the portions of the cables adjacent thereto, as clearly shown. The respective ends of the united shields are soldered to the cable and branch by the wipe-joints 4, thus forming a water-tight casing around the joints of the conductors. These shields or covers are formed of lead or alloy thereof, or of some malleable metal, and are stamped to the required shape previous to being applied to the cable and branch. The size and shape of the shields are made to correspond with the size of the cable and branch to which they are to be applied, and to the form and number of branches to be formed at any one point. As, for example, if branches are to be formed on opposite sides of the cable at the same point along the length of the cable, the shields should be given a cruciform shape, as will be easily understood.

In lieu of forming the covering-plates in two parts or members, as above stated, they may be formed in one piece, as shown in Fig. 3.

I claim herein as my invention—

1. A cable having a soft-metal body inclosing insulated conducting-wires therein, in combination with a metal-covered branch cable having its wires connected to one or more of the wires of the main cable, the joints between such wires being insulated and the metal protecting-shield secured around the joint between the main and branch cables and to the metal body of the main and branch cables, substantially as set forth.

2. A cable having a soft-metal body inclosing insulated conducting-wires therein, in combination with a metal-covered branch cable having its wires connected to one or more of the wires of the main cable, the joints between such wires being insulated, and sectional metal protecting-shields secured around the joint between the main and branch cables and the metal body of the main and branch cables, substantially as set forth.

In testimony whereof I have hereunto set my hand.

RICHARD S. WARING.

Witnesses:
W. B. CORWIN,
DARWIN S. WOLCOTT.